(12) United States Patent
Bockhold et al.

(10) Patent No.: US 10,725,615 B2
(45) Date of Patent: Jul. 28, 2020

(54) SOCIAL CONTACT INFORMATION ORGANIZED IN A GRID LIKE VISUAL OBJECT

(71) Applicant: Ligos Corporation, Savannah, GA (US)

(72) Inventors: Keith Bockhold, Vancouver (CA); Murray Bockhold, Vancouver (CA)

(73) Assignee: Grideo Technologies Inc., Vancouver (CA)

( * ) Notice: Subject to any disclaimer, the term of this patent is extended or adjusted under 35 U.S.C. 154(b) by 302 days.

(21) Appl. No.: 14/627,486

(22) Filed: Feb. 20, 2015

(65) Prior Publication Data
US 2016/0246452 A1 Aug. 25, 2016

(51) Int. Cl.
*G06F 3/0482* (2013.01)
*G06F 3/0488* (2013.01)
*G06Q 50/00* (2012.01)

(52) U.S. Cl.
CPC .......... *G06F 3/0482* (2013.01); *G06F 3/0488* (2013.01); *G06Q 50/01* (2013.01)

(58) Field of Classification Search
CPC ............. G06F 17/30716; G06F 3/0482; G06F 3/04842; G06F 3/04847; G06F 3/0488; G06Q 50/01; H04L 51/32; H04L 51/10; H04N 5/23293
See application file for complete search history.

(56) References Cited

U.S. PATENT DOCUMENTS

| 8,676,123 | B1 | 3/2014 | Hinkle | |
|---|---|---|---|---|
| 9,542,076 | B1* | 1/2017 | Onyon | H04L 67/306 |
| 9,710,661 | B2 | 7/2017 | Choi et al. | |
| 2007/0186182 | A1* | 8/2007 | Schiller | G06F 17/30899 715/781 |
| 2009/0143052 | A1* | 6/2009 | Bates | G06F 17/30575 455/414.2 |
| 2010/0043062 | A1* | 2/2010 | Alexander | G06F 21/36 726/6 |
| 2010/0060788 | A1* | 3/2010 | Blackburn | H04N 5/4401 348/563 |

(Continued)

OTHER PUBLICATIONS

Stephanie Buck, Mashable, "The Beginners Guide to Instagram", uploaded May 29, 2012 to http://mashable.com/2020/05/29/instagram-for-befinners/#leCDlxvqqZqZ, retrieved Mar. 10, 2018. (Year: 2012).

(Continued)

*Primary Examiner* — Tadesse Hailu

(57) ABSTRACT

User interface to facilitate user management of contact information on computing devices. Contact information related to a software application is represented using a grid like visual object within a graphical user interface (GUI), or herein a "social grid". A social grid includes a plurality of pictorial tiles, each representing a contact group, such as an individual, a group of individuals, or an external social network, etc. The social grid is customizable by user configurations and/or automatically based on a number of predefined factors, such as the number of individuals included in a group, the frequency of contacting a contact group, the user-indicated preference for a contact group, etc.

16 Claims, 12 Drawing Sheets

(56) References Cited

U.S. PATENT DOCUMENTS

| | | | |
|---|---|---|---|
| 2010/0162171 A1* | 6/2010 | Felt | H04M 1/27455 715/835 |
| 2011/0026898 A1 | 2/2011 | Lussier et al. | |
| 2012/0110096 A1* | 5/2012 | Smarr | H04W 4/21 709/206 |
| 2012/0162266 A1* | 6/2012 | Douglas | G06F 3/0481 345/677 |
| 2012/0182316 A1* | 7/2012 | Moha | G06F 17/30274 345/636 |
| 2013/0117365 A1 | 5/2013 | Padmanabhan et al. | |
| 2013/0145259 A1* | 6/2013 | Kiefer, III | G06Q 30/02 715/249 |
| 2013/0212507 A1 | 8/2013 | Fedoseyeva et al. | |
| 2013/0303143 A1 | 11/2013 | Schrader et al. | |
| 2014/0019871 A1* | 1/2014 | Bluvband | G06F 3/04842 715/739 |
| 2014/0164939 A1* | 6/2014 | Tamura | H04L 67/02 715/740 |
| 2014/0164994 A1 | 6/2014 | Myslinski | |
| 2014/0179426 A1* | 6/2014 | Perry | A63F 13/10 463/31 |
| 2014/0282166 A1* | 9/2014 | Temkin | G06F 3/04845 715/769 |
| 2014/0330900 A1 | 11/2014 | Libin et al. | |
| 2014/0344288 A1* | 11/2014 | Evans | G06F 17/30867 707/749 |
| 2015/0074606 A1* | 3/2015 | Melen | G06F 3/04817 715/835 |
| 2015/0195620 A1* | 7/2015 | Buchner | H04N 21/4788 725/141 |
| 2015/0281577 A1 | 10/2015 | Ruben et al. | |
| 2015/0373065 A1 | 12/2015 | Holmquist et al. | |
| 2016/0034437 A1* | 2/2016 | Yong | G06Q 30/0241 715/202 |
| 2016/0057154 A1* | 2/2016 | Ferguson | H04L 63/104 726/7 |
| 2016/0188894 A1 | 6/2016 | Factor et al. | |

OTHER PUBLICATIONS

Jordan Crook, TechCrunch, "Instagram Video vs. Vine", uploaded Jun. 29, 2013 to https://techcrunch.com/2013/06/20/instagram-video-vs-vine-whats-the-difference/, retrieved Mar. 14, 2018. (Year 2013).

Jacob Kastrenakes, The Verge, "Instagram Direct: A Look at Private Chats for Your Photos and Videos", uploaded Dec. 12, 2013 to https://www.theverge.com/2013/12/12/5203742/instagram-direct-photo-video-messaging-service-hands-on, retrieved Mar. 10, 2018. (Year 2013).

Kevin Systrom, Instagram blog, "Introducing Video on Instagram", uploaded on Jun. 20, 2013 to http://blog.instagram.com/pos/53448889009/video-on-instagram, retrieved Mar. 10, 2018. (Year 2013).

* cited by examiner

SOCIAL CONTACT INFORMATION ORGANIZED IN A GRID LIKE VISUAL OBJECT

TECHNICAL FIELD

The present disclosure relates generally to the field of user interfaces in computing devices, and, more specifically, to the field of graphical user interfaces for contact information visualization and management.

BACKGROUND

In general, software programs providing communication functions usually allow a user to save, organize and access relevant contact information through a graphical user interface (GUI), e.g., native phone applications in smartphones, email applications, social media network applications, game applications, etc. For example, an email directory in an email application may be displayed to present the addresses, phone numbers and other information about the contacts stored therein.

Conventionally, contact information is usually presented as a contact list (e.g., alphabetically) which facilitates a user to organize and access desired contact information. Unfortunately, if a user has a large number of contacts related to a particular software application, searching or navigating through a long list of contact information to access desired contact information is non-intuitive and can be time-consuming. Some applications allow a group of individual contacts to be collectively represented by a group identification, which is no more than a text label included in the contact list.

Further, it has become increasingly popular for users of messaging applications (email, texting and so on) and social media networks to share messages, discussions and multimedia with each other using mobile computing devices, such as smartphones or other tablets. However, the screen size is limited, often necessitating the use of small text that can be difficult to read, and multiple screen areas that require extra user interaction (scrolling) to display contact information. Furthermore, the messaging, contact selection and sharing functionalities on mobile devices are usually poorly integrated and limited. For instance, a user typically needs to shoot a video clip using a software application native to a mobile device (e.g., the "camera" feature), and then open another application software and use its "share" feature which allows the user to access the video from a gallery folder and post it to a social media network of choice. The posting process may also be complex, requiring several selections, etc.

Conventional social network applications designed for mobile computing devices have insufficient features for users to manage and organize recipients efficiently within the applications. A user is often forced to manage contact information through a web browser on a different type of device (usually a desktop personal computer, through a web browser interface, etc.) before sharing a message with the selected recipients. In other words, the functionality to modify or group together contacts is not allowed on the mobile device. Moreover, a user is typically forced to first choose recipients before composing the content of a message. These existing methods inevitably restrict the users' ability, for instance, to capture spontaneous moments with pictures and video and then quickly share them with a wide audience.

SUMMARY OF THE INVENTION

Therefore, it would be advantageous to provide a simple and intuitive user interface for users to efficiently manage and use contact information on a computing device. It would also be advantageous to provide a convenient platform for users to manage contact information for a social media network on a mobile computing device. It would be further advantageous to provide this interface within application software, e.g., an "application," in an integrated fashion that facilitates more immediate sharing using mobile computing devices, such as smartphones.

Accordingly, embodiments of the present disclosure employ a computer implemented method of rendering a graphical user interface (GUI) on a computing device to present contact information in a grid-like form. The contact information is organized in a grid like visual object including a plurality of pictorial tiles, each representing a contact group, an individual, or an external network, etc. A user interaction with a pictorial tile identifies a corresponding contact group for a desired communication function, e.g., sharing a message with the contact group through a social media network. The grid like visual object is customizable by user manual configurations. The visual object may also be dynamically adjusted in an automated fashion based on characteristics of the contact groups, such as the number of individuals in each contact group, the amount of messaging activities related to each contact group, and the user indicated preferences for each contact group, or any other programmed attributes.

Advantageously, a user's contact information is aggregated and organized into a pictorial grid like visual object, which is intuitive and convenient to manage and use as opposed to the conventional approaches in which contacts are displayed with merely text labels and possibly icons.

A social grid according to the present disclosure can be used to visually represent a contact directory in an email application, contact (e.g., "Friends") in a social media network application, contacts in a phone application, contacts in an on-line chatting application, connected players in an on-line game application, and etc. Particularly in the context of social media network, a social grid can be used to represent a membership list for online directories, special interest groups, online dating sites, and etc.

According to one embodiment of the present disclosure, a computer implemented method of facilitating users to organize social contact information using a computing device comprises rendering an on-screen graphical user interface (GUI) for display on a display device of the computing device. The on-screen GUI comprises a grid like visual object including a plurality of pictorial tiles arranged in a grid like pattern. A respective pictorial tile represents a contact group comprising one or more social contacts related to an application program. Responsive to a first user interaction with the respective pictorial tile, an operation defined in the application program is automatically invoked, such as sharing digital content via the Internet, initiating a telephone conference call, prompting a live chat session, or sending a message, etc.

Responsive to a second user interaction with the respective pictorial tile, information related to the one or more social contacts is displayed within the on-screen GUI. The information includes contact information and a communication history. The composition of the contact group or the information is then edited based on user input.

The grid like pattern can be changed based on user input, such as adjusting aspect ratios and sizes of the pictorial tiles, varying display formats of displayed text, and changing locations of the plurality of pictorial tiles. A respective pictorial tile may include a still image or a moving image that is user-configurable. The grid like pattern can also be adjusted automatically based on a set of predetermined attributes of a plurality of contact groups represented by the plurality of pictorial tiles. The set of predetermined attributes may include: respective numbers of social contacts within the plurality of contact groups; respective contact frequencies of the plurality of contact groups; and respective user preferences of the plurality of contact groups.

According to another embodiment of the present disclosure, a non-transitory computer-readable storage medium embodying instructions that, when executed by a mobile processing device, cause the mobile processing device to perform a method of facilitating user accesses to contact information. The method comprises rendering an on-screen graphical user interface (GUI) for display on a display device of a mobile computing device. The on-screen GUI is configured to present a grid like graphical object comprising a plurality of tile graphical objects arranged in a display pattern, a respective tile graphical object representing a contact group comprising one or more social contacts of a user of the mobile phone device. The one or more social contacts are affiliated with a social media network. A first user interaction with the respective tile graphical object corresponds to a user instruction to select the one or more social contacts as recipients of a digital content. The digital content is sent from the mobile processing device to a server of the social media network for sharing.

According to another embodiment of the present disclosure, a computing device comprises a processor; communication circuits coupled to the processor; and memory coupled to the processor and comprising instructions that, when executed by the processor, cause the computing device to perform a method of facilitating user accesses to social contact information. The method comprises rendering an on-screen graphical user interface (GUI) for display on the touchscreen display. The on-screen GUI comprises a grid like visual object having a plurality of pictorial tiles arranged in a grid pattern, a respective pictorial tile representing a contact group comprising one or more social contacts related to an application program. Responsive to a first user interaction with the respective pictorial tile, the one or more contacts are selected for an operation defined in the application program.

This summary contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying drawing figures in which like reference characters designate like elements and in which.

DETAILED DESCRIPTION

Figure 1:
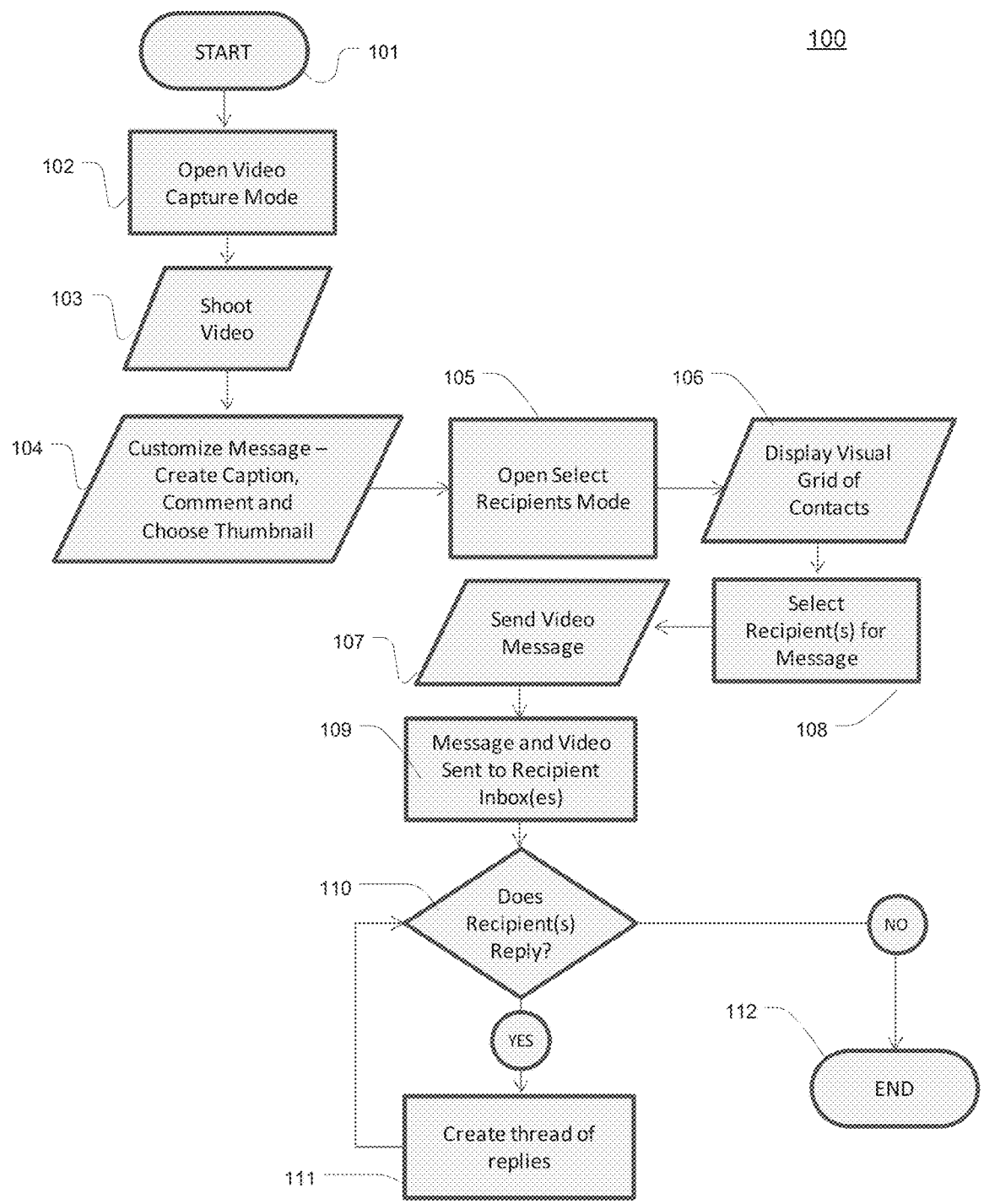
FIG. 1 is a flow chart depicting an exemplary computer implemented process of capturing a video and sharing the video responsive to user interactions with a GUI in accordance with an embodiment of the present disclosure.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

Notation and Nomenclature:

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or client devices. When a component appears in several embodiments, the use of the same reference numeral signifies that the component is the same component as illustrated in the original embodiment.

Integrated Video Capturing and Sharing Application for Handheld Device

Overall, according to embodiments of the present disclosure, contact information related to a software application is represented using a grid like visual object within a graphical user interface (GUI), or herein a "social grid". A social grid includes a plurality of pictorial tiles, each representing a contact group, such as an individual, a group of individuals, or an external social network, etc. The social grid is customizable by user configurations and/or automatically based on a number of predefined factors, such as the number of individuals included in a group, the frequency of contacting a contact group, the user-indicated preference for a contact group, etc.

According to embodiments of the present disclosure, a single application program implemented on a mobile computing device integrates the functionalities of video shooting, video editing, video sharing and contact information management. Upon being invoked, the application program directly enters into the video shooting mode of a graphical user interface (GUI) where a user can start to capture a video after interacting with the GUI only once. The same application can be used to transmit the video to selected contacts that are identified via a social grid.

Hereinafter, the terms "video," "video file," "audiovideo," "video clip," "video content" are used interchangeably; the terms "shoot," "capture," and "record" are used interchangeably.

FIG. 1 is a flow chart depicting an exemplary computer implemented process 100 of capturing a video and sharing the video responsive to user interactions with a GUI in accordance with an embodiment of the present disclosure. Process 100 is an instantiation of a single application program executable on a mobile computing device, e.g., a smartphone, a tablet, etc. Such a device is equipped with one or more cameras and a touch screen display. The application program provides a platform for registered users of one or more social media networks to communicate with each other via the social media network servers, such as to send text messages, and share photos, audio clips, video clips or other digital contents, etc. Responsive to user input through the GUI, the application program controls the camera system of the mobile device to capture videos, edit videos, organize contacts, select one or more contacts and transmit the video to the selected contact(s).

As shown, upon the application being invoked to run by the user at 101, the GUI directly enters into a video shooting mode at 102. At 103, the GUI receives a user instruction to capture a video through the GUI. For example, this user instruction corresponds to a user single touch gesture on a "record" button on the GUI (e.g., button 301 in FIG. 3). However, it will be appreciated that the present disclosure is not limited to any specific user gesture or other input means to invoke a corresponding function described therein.

After review, if the user decides not to share the video with other users, another video can be captured (or recaptured). The initially captured video file may be automatically discarded or saved to a gallery folder accessible to the application program.

On the other hand, if the GUI receives a user instruction to share the video, the GUI enters into message composing mode at 104 to receive user input for a caption, a comment, or alike, to edit the video in this fashion. The video clip is automatically attached to the message. The user can also chose a still or moving image thumbnail to represent the video content.

In the instant embodiment, message communications via a social network are restricted to registered users who have previously connected with each other in the same social network, e.g., by accepting each other as a "friend" or "link" in the social network. Recipients of the message are first selected by the user. The message is sent out to the selected recipients through a server hosted by the social network. Once the message is sent, at the sender's option, the original video file may remain stored in the sender's mobile computing device or be maintained in a remote storage managed by the server.

More specifically, once a video sharing message is created, the GUI enters into a recipient select mode at 105 to receive a user selection on one or more recipients of the message. The user selects recipients from a contact list. According to the present disclosure, the contact list is represented by a grid like visual object (or social grid) at 106, as will be described in greater detail below. At 108, the user may select an individual, multiple individuals, or a pre-configured contact group (for example "Family," "Classmates," etc) to receive the message. At 107, the video message is sent to selected recipients.

If any selected contact is not connected with the sender in the social network ("unconnected contact"), the sender can open a contact management window within the GUI at and send an invitation to connect. But the video message cannot be delivered to the unconnected contact until the contact accepts the invitation. However, in some other embodiments, a video message can be delivered to unconnected contacts as well. Further, in some embodiments, the application program provides an integrated interface for multiple social networks and hence a video message can be sent to the sender's contacts in different social networks.

Once the video message is uploaded to the server, the server sends notifications to the recipients' message inbox about the new message. A GUI according to the present disclosure can present received video sharing messages as well as playback video files therein. In one embodiment, if a recipient opens the video message for view, the video is downloaded to the recipient's mobile device. Alternatively, the video is streamed to the recipient's mobile device for play. If, at 110, a recipient composes a response through the GUI to the sender and optionally to other recipients, a shared message thread is created between the sender and the recipients at 111. Otherwise, the video capturing and sharing process ends at 112. The thread can build up with additional responses from the recipients and the sender. The foregoing process 103-112 is repeated each time a video file is captured and shared.

Therefore, according to the present disclosure, a user can conveniently shoot videos, edit video messages, manage contact information, and share videos with selected recipients all within the environment of an integrated GUI of a single application resident on a mobile device. The GUI directly enters to a video shooting mode upon the program being invoked, facilitating a user to capture spontaneous moments. Moreover, the user does not have to step into a gallery function native to the mobile device to select a pre-recorded video file, or start within the gallery and to use its share function.

Figure 2A:
FIG. 2A illustrates an exemplary GUI of an integrated visual contacts grid, rendered on the display device of a mobile computing device and configured to receive user input to capture and share videos and messages according to an embodiment of the present disclosure.

It will be appreciated that various GUI configurations and designs can be used without departing from the purview of the present disclosure. FIG. 2A illustrates an exemplary on-screen GUI 200 rendered on the display device of a mobile computing device and configured to receive user input to capture and share videos according to an embodiment of the present disclosure. In the instant example, GUI 200 is in a contact management mode where contact groups are represented by pictorial tiles arranged into a grid like pattern, or a social grid 210. A user interaction with a pictorial tile identifies the whole contact group as selected recipients for a video message, as will be described in greater detail below. A user interaction with the plus icon 225 leads to a GUI window allowing the user to add a contact group in the social grid. The "Edit" button 226 allows a user to edit the social grid, e.g., delete a contact group from the grid. The GUI also includes the on-screen buttons 221-224 for users to switch to another GUI mode, including the video shooting mode button 221, the social grid management and display button 222, the message center button 223, and option configuration button 224. In the illustrated example, the number of received new messages is indicated on the message center button 223.

Figure 2B:
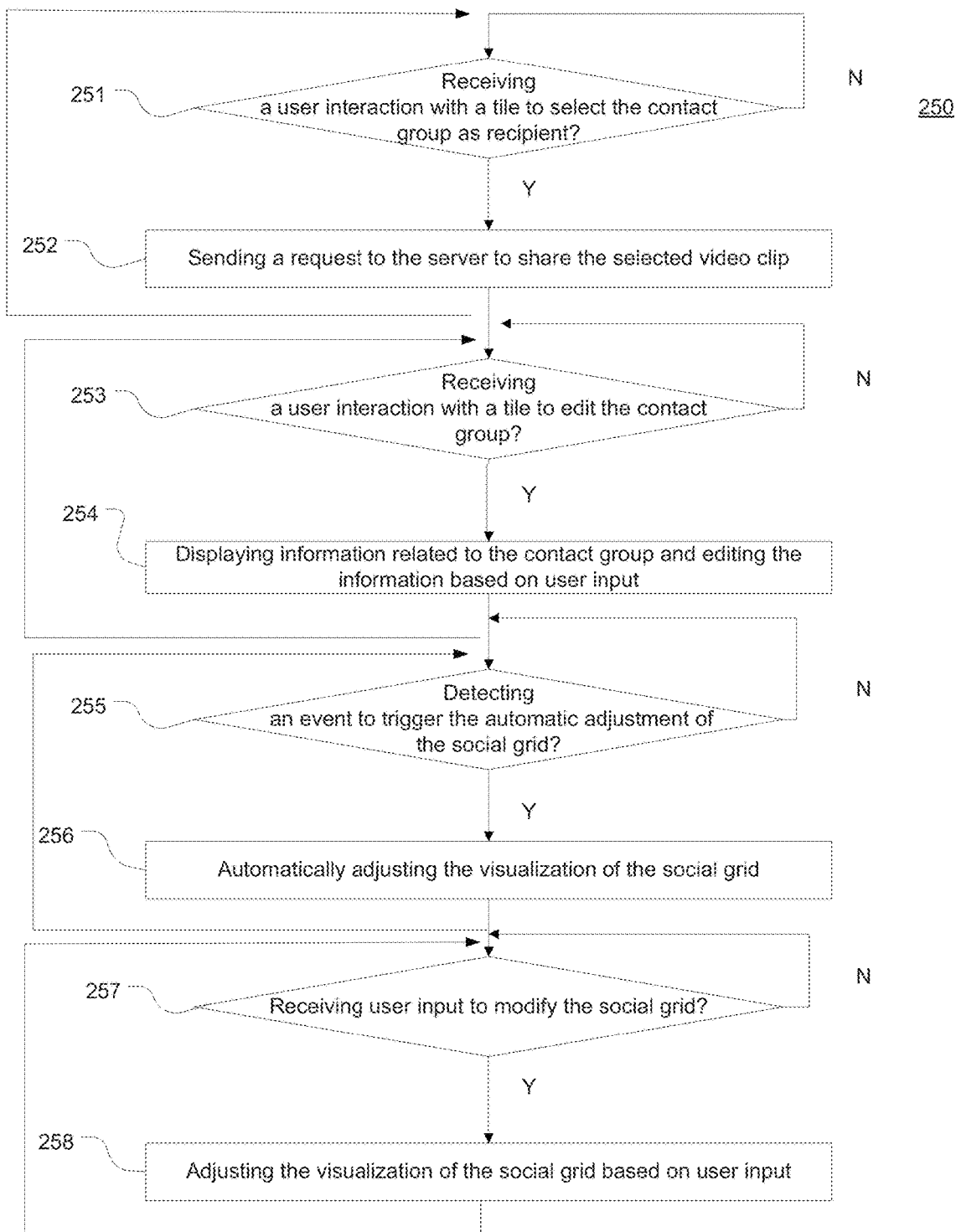
FIG. 2B illustrates an exemplary computer implemented method of managing a social grid according to an embodiment of the present disclosure.

FIG. 2B illustrates an exemplary computer implemented method 250 of managing a social grid in a video sharing application according to an embodiment of the present disclosure. At 251, it is determined whether a user interaction with a tile of the social grid is received and recognized as a user instruction to select the contact group as recipient(s) of the video sharing message. If yes, at 252, a request is sent to the social network server for delivering the video sharing message to the selected recipients represented by the tile. The request includes the video clip, the user typed capture and comments, and the identifications of the selected recipients.

In some other embodiments, depending on the functions and configurations defined in the associated application program, a user interaction with a social grid may correspond to the operation of sending an email to the selected contacts, initiating a conference phone/video call with the selected contacts, starting a game with the selected contacts, viewing personal profiles or other embedded information of the selected contacts, or prompting an on-line chat session, etc.

At 253, it is determined whether a user interaction with a tile is received and recognized as operations to edit the contact group. If yes, at 254, the information related to the selected contact group is displayed and can be edited based on user input. The information includes the contact information, communication histories, etc.

At 255, it is determined whether an event to trigger the automatic adjustment of the social grid is detected. If yes, at 256, the visualization of the social grid is adjusted according to a an automated process, including the tile sizes, tile aspect ratios, tile label text formats, tile locations, etc. The trigger events are predefined and related to the number of individuals included in a group, a communication frequency between the group and the user, a user preference indication ("favorite" or "regular") and so on. For instance, the event that a contact group becomes the most populated group can trigger the automatic adjustment process which involves causing the corresponding tile to become the largest among the social grid.

At 257, it is determined whether user input is received and recognized as instructions for modifying the social grid manually. If yes, the visualization of the social grid is modified based on user input at 258.

Although embodiments of the present disclosure are described with reference to application programs designed for video shooting and network sharing thereof, the present disclosure is not limited by the application program capable of rendering a social grid. A social grid can be used to visually represent a contact directory in an email application, contact (e.g., "Friends") in a social media network application, contacts in a phone application, contacts in an on-line chatting application, connected players in an on-line game application, and etc. Particularly in the context of social media network, a social grid can be used to represent a membership list for online directories, special interest groups, online dating sites, and etc. In some embodiments, a social grid may integrate the contact information associated with more than one application. For instance, the contact groups included in a social grid may be affiliated with multiple social networks.

Application programs that can render a social grid according to the present disclosure may be implemented in any type of computing devices, such as desktops, servers, game consoles, smartphones, touchpads, e-readers, and etc.

Figure 3:
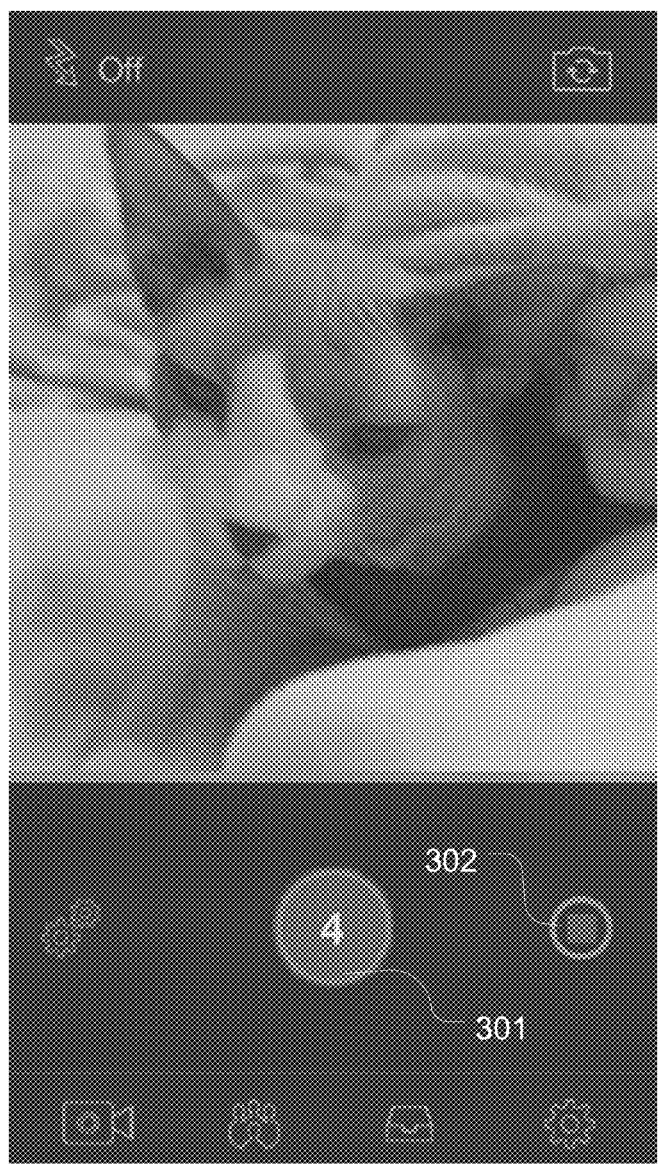
FIG. 3 illustrates an exemplary GUI in a video shooting mode in accordance with an embodiment of the present disclosure.

FIG. 3 illustrates an exemplary on-screen GUI 300 in a video shooting mode in accordance with an embodiment of the present disclosure. Upon loading the application program, the GUI 300 directly enters into this video shooting mode. Once a user simply taps on the button 301, the camera is triggered to record. In some embodiments, the user can edit the video during recording, such as pause, resume, zoom, slow motion, etc. After the user stops the recording by tapping the button 302, the user can review the video and may choose to discard it and re-shoot one. If the user chooses to keep the video, the GUI 300 automatically switches to the message composing mode for the user to compose a video sharing message, as will be described in detail with reference to FIG. 7.

Figure 4:
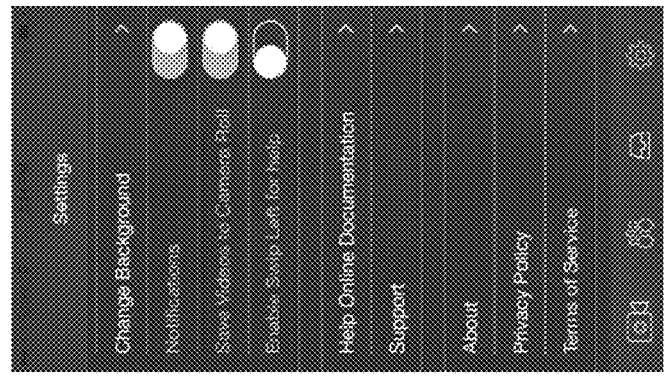
FIG. 4 illustrates an exemplary GUI in an account configuration mode in accordance with an embodiment of the present disclosure.
Figure 4:
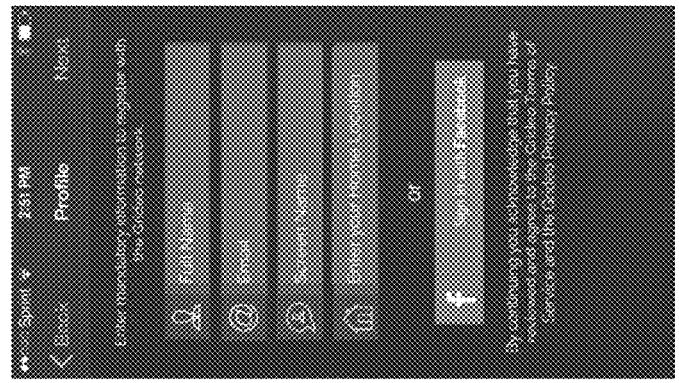
Figure 4:

FIG. 4 illustrates an exemplary on-screen GUI 400 in an account configuration mode in accordance with an embodiment of the present disclosure. The present disclosure is not limited to any specific type of social media networks through which users can share videos using mobile devices. An application program according to the present disclosure may be dedicated to a single social network or serve as a generic platform for multiple social networks selected by the device user.

Diagram 410 shows a greeting page displayed once a new user installs the exemplary application program. In this example, the program links to a social network named "Grideo." Diagram 420 shows an account setup page for a user to register with the network and build a network of contacts, including connecting with existing Grideo users, sending invitations to phone contacts or social network contacts, setting up application preferences, etc. In this example, a user account with an external social network "Facebook" can be synchronized with "Grideo." Diagram 430 shows a "Settings" page in which a user can set personal references, such as profile information, notification settings, support access, privacy settings, and others. For example, the option page is prompted open when a user interacts with the "options" button 224 in FIG. 2.

Social Grid GUI

Figures 5A, 5B:
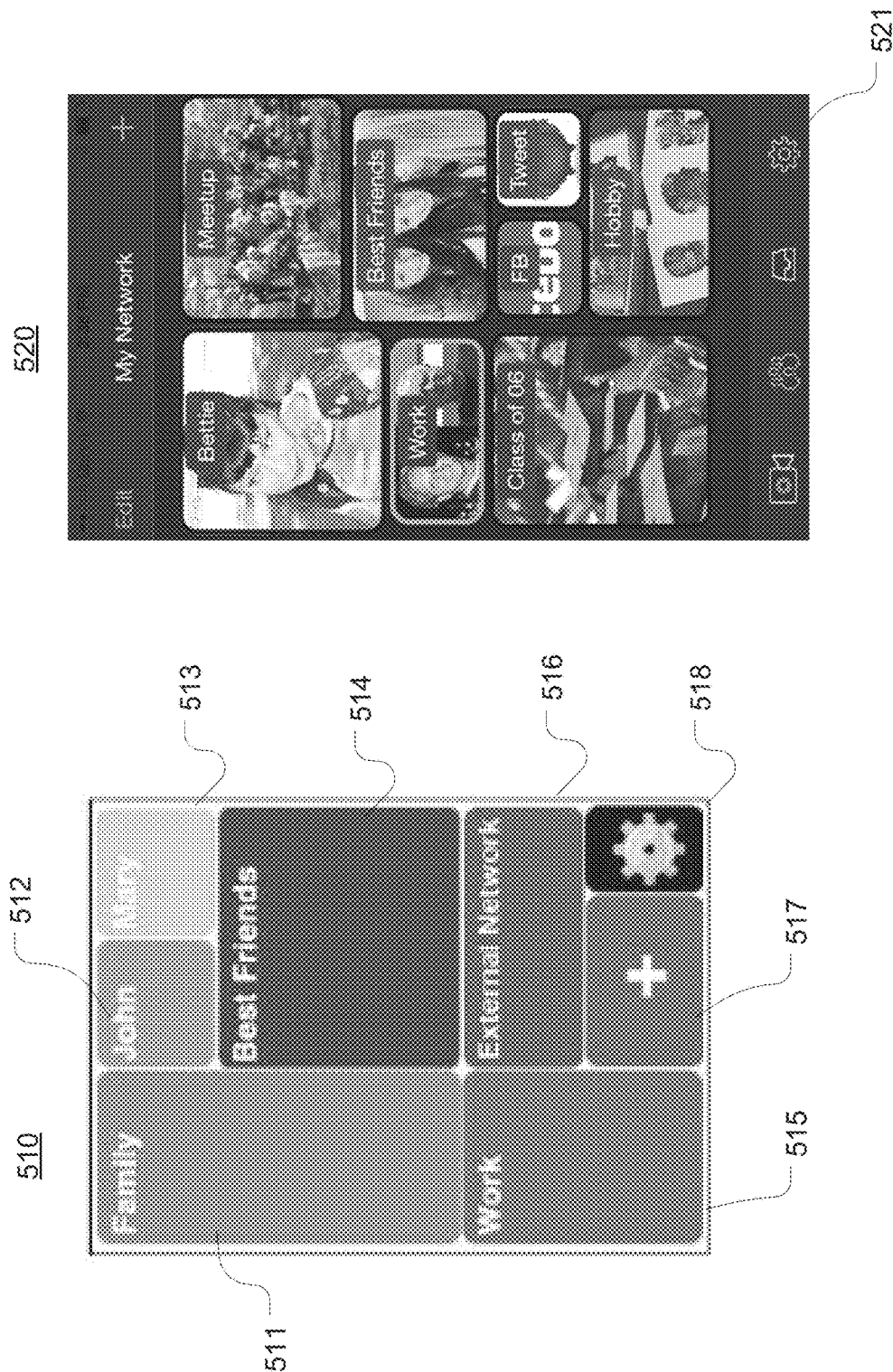
FIG. 5A illustrates an exemplary social grid layout in accordance with an embodiment of the present disclosure.
FIG. 5B illustrates an exemplary social grid populated with the user's contacts based on the social grid layout in accordance with an embodiment of the present disclosure, and integrated into an exemplary messaging application.

FIG. 5A illustrates an exemplary social grid layout 510 in accordance with an embodiment. Layout 510 is composed of tiles 511-518 of varying sizes, aspect ratios, colors, etc. Each tile is substantially rectangular shaped and assigned with a sample name. The "Family" tile 511, "Best Friends" tile 514, "Work" tile 515, and "External Network" tile 516 are exemplary and represent respective contact groups, each including one or more individual contacts or an external social network. The "John" and "Mary" tiles 512 and 513 represent respective contact individuals. The icons 517 and 518 represent user management tools. Layout 510 may be one of many layout templates provided by the application program.

A social grid is user configurable with respect to tile locations, sizes, aspect ratios, labels, colors, and representative images etc. In some embodiments, a social grid may be automatically and dynamically adjusted based on a set of attributes of the contact information represented by the tiles. For example, the tiles are rearranged and repositioned based on the number of individuals included in a group, a communication frequency between the group and the user, a user preference indication ("favorite" or "regular") and so on. The set of attributes may be pre-defined by the application program and/or configured based on user input.

FIG. 5B illustrates an exemplary social grid 520 populated with the user's contacts based on social grid layout 510. In the present example, the social grid is implemented as a part of a video sharing application that provides a social networking platform for users to capture videos on a mobile device and then share the videos via the Internet. As shown, the GUI 200 including the social grid 210 is rendered on a mobile computing device through which a user can capture a video quickly and then share it with predefined contact groups or individuals. As for a particular application, there may be associated with multiple social grids. For instance, a user can swipe on a touchscreen device to switch to another social grid.

Each contact or contact group is represented by a user-selected image in the tile, which may be a still image or a moving image. The user can customize the images assigned to the tiles. Further, a social grid may include multiple pages accessible through swiping or other suitable use interactions with the GUI. The social grid advantageously provides an intuitive visualization of contact information and hence facilitates a user to manage and access the information therein. Moreover, the social grid may provide access to additional data related specifically to the selected group, such as a description and or a summary history of communications received from and sent to the individual(s).

A user interaction with the "plus" icon 521 leads to a contact list page. A user can use the mobile device to add a new tile for a new individual contact or a new group.

Figure 5C:
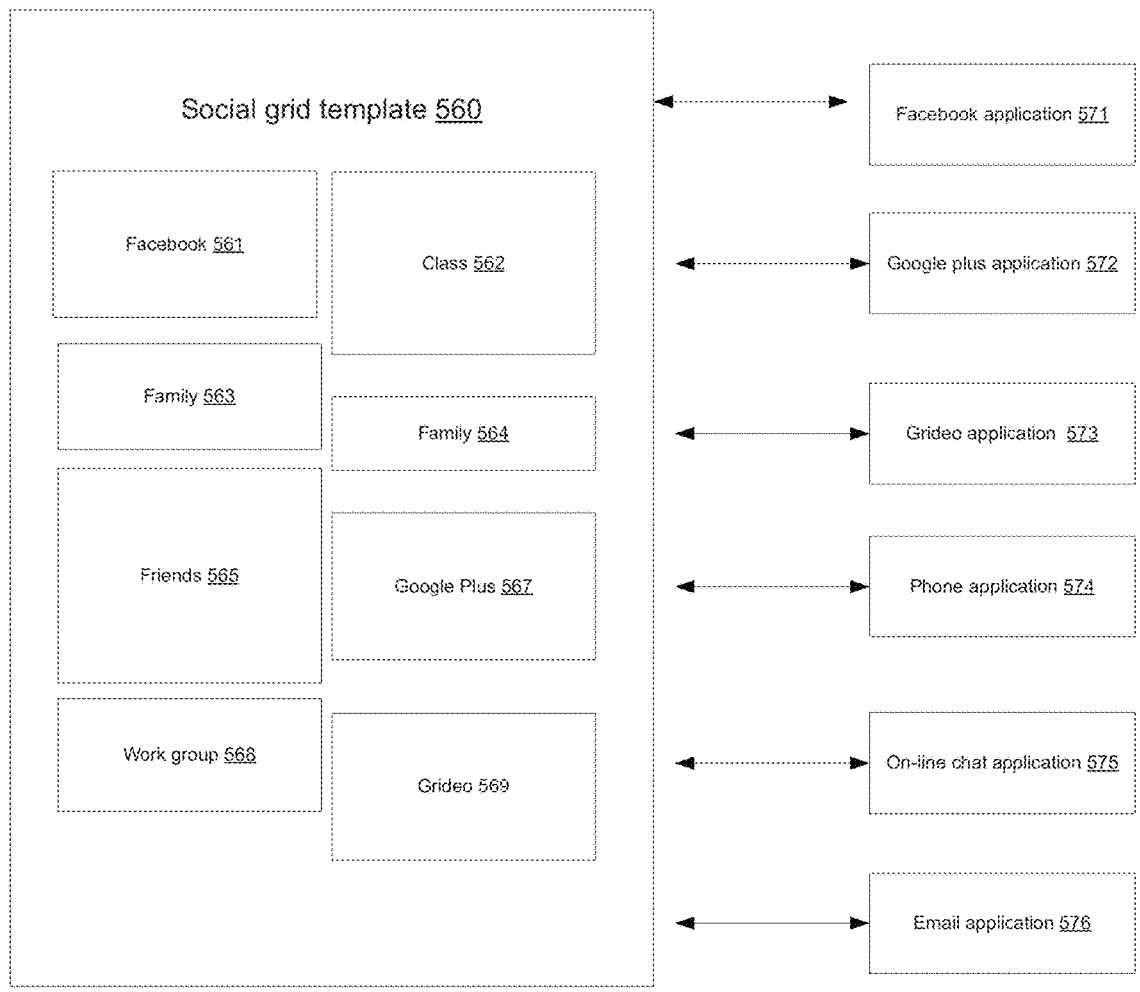
FIG. 5C illustrates an exemplary social grid template configured to provide a graphical user interface that integrates the social contact information used by multiple application programs in accordance with an embodiment of the present disclosure.

FIG. 5C illustrates an exemplary social grid template 560 configured to provide a graphical user interface that integrates the social contact information used by multiple application programs 571-576 in accordance with an embodiment of the present disclosure. The social grid template 560 includes the social groups 561-569 that can be edited and populated with respective contact information and pictorial images by a user. Each social group in the social grid 560 can be linked to one or more of the application programs as customized by the user, such as the social network applications 571-573, the phone application 574, the on-line chat application 575, the email application 576, etc. It will be appreciated that the contact information in a contact group can include various sorts of information requisite for invoking the operations defined in corresponding application programs, such as email address, social network member identification, phone number, etc. Therefore a social grid based on the template 560 advantageously can provide an integrated user interface for a user to manage and use the contact information associated with multiple application programs.

Figure 6:
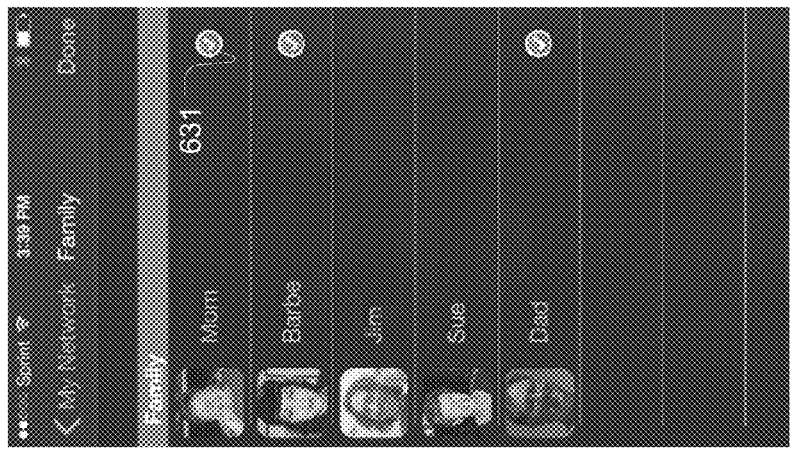
FIG. 6 illustrates exemplary contact list pages from which a user can select contacts and add to contact groups in a social grid in accordance with an embodiment of the present disclosure.
Figure 6:
Figure 6:
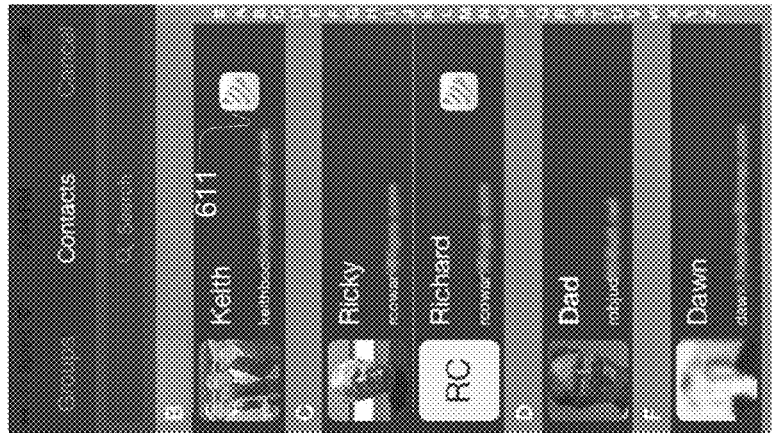

FIG. 6 illustrates exemplary social grid editing pages 610, 620 and 630 from which a user can edit contact groups and the visual presentation features of the social grid in accordance with an embodiment of the present disclosure. Contacts selected from the contact list shown in 610 are added to an existing group in the social grid 520 in FIG. 5B. The icon "611" indicates the affiliation status of an individual with the network "Grideo." Diagram 620 shows the pictorial tile "Family" is being adjusted responsive to user input. For instance, the user can drag the edges of the tile to change the aspect ratio, pinch in/off to adjust the size, or type in a new name for the group. The user can navigate through their existing contacts to select and add to the group. Diagram 630 shows that a user can select/deselected individuals within a group to identify recipients, as indicated by the check marks 631. Thus, contact information as well the visual representation thereof can be conveniently edited, e.g., changed or deleted or added using the mobile device.

Figure 7:
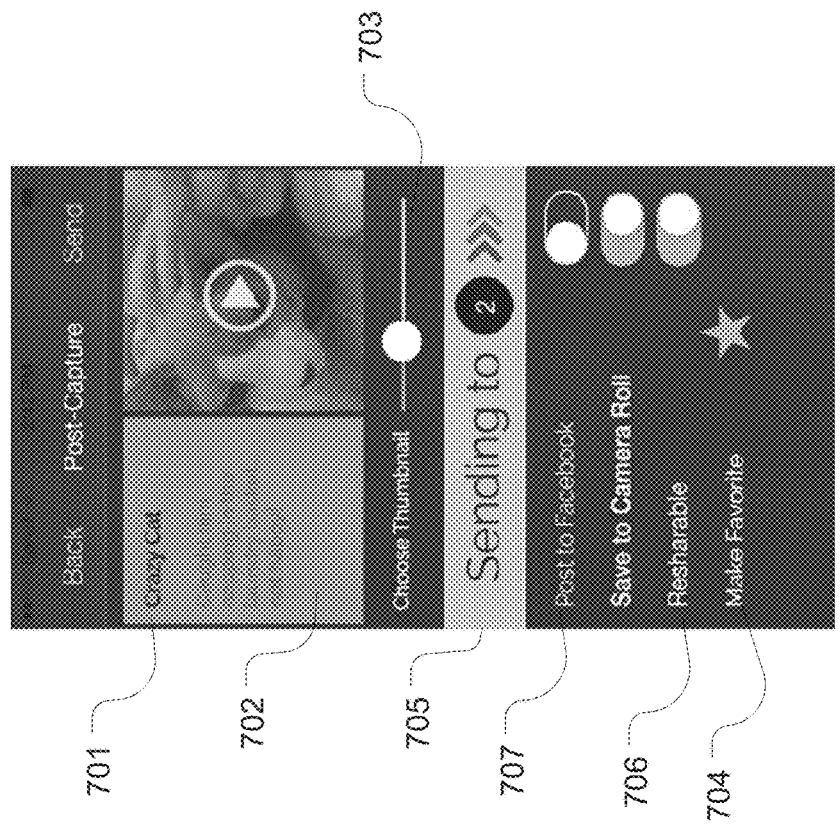
FIG. 7 illustrates an exemplary GUI in a message composing mode in accordance with an embodiment of the present disclosure.

After a video is recorded and the user elects to share it, the GUI presents a message composing page. FIG. 7 illustrates an exemplary on-screen GUI 700 in a message composing mode in accordance with an embodiment of the present disclosure. The user can caption the video in area 701, leave an optional comment in area 702, and select one from several thumbnails using the bar 703 to represent the video. The user can choose to save the video to the local storage in the mobile device. Alternatively, in another mode, the video is deleted from the mobile device once it is uploaded to the social network server and stored in a remote storage managed by the server. The user can tap the icon 704 to indicate that this video is a "Favorite," so that it is easily accessible in the message center later. In one embodiment, each registered user is assigned with a definitive storage volume in the remote storage. Older videos may be automatically purged to make room for the newly uploaded videos. A "Favorite" status can protect a video from such a purge operation such that the video can remain stored for a longer or indefinite time until the user requests to remove it. The user can also assign additional data to the communication. In this example, a user can use the switch 706 to set whether or not the clip is resharable to others outside the original specified recipients, and use the switch 707 to post the clip directly to his or her "Facebook" account.

When a message is completed, a user tap gesture on the "Sending to" on-screen button 705 brings up the social grid as shown in FIG. 5B. The user can select a group and/or single contact (for example, "Family" and "Susan") to share the video with the contacts in the group, e.g., by single-tapping the corresponding tile. The user can also choose only selected recipients within a group by interacting with, e.g., double-tapping, the corresponding tile to open a page 630 in FIG. 6. Then the user can review and send or discard the message. Once the user confirms to send the message out, e.g., by clicking an on-screen "send" button included in the social grid page, the message content is uploaded to the server which parses the recipient information and notifies recipients of the new video message in their own message inboxes, thereby transmitting the video message to all selected recipients.

Figure 8:
FIG. 8 shows examples of message center pages of the GUI configured for video shooting and sharing according to an embodiment of the present disclosure.
Figure 8:
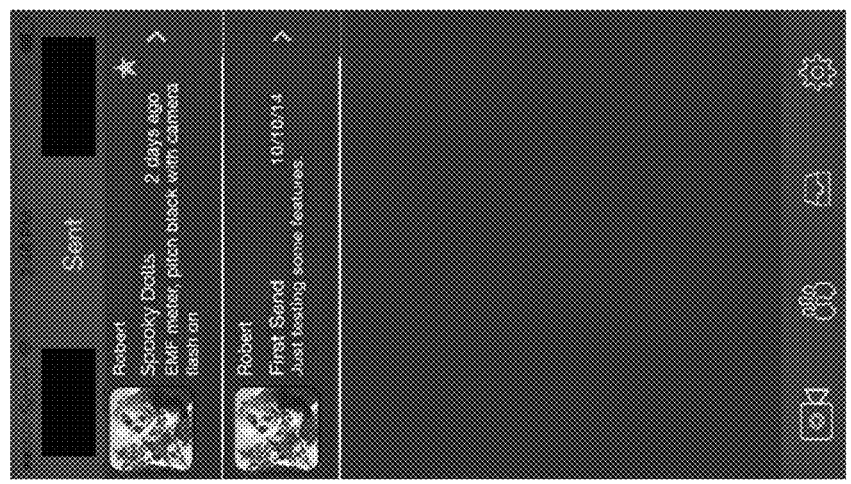
Figure 8:

Inbound and outbound messages are organized at a message center of the GUI. The message center coordinates and presents the ongoing feed of inbound messages, outbound messages, comments associated with those messages, and notifications of new messages. FIG. 8 shows examples message center pages 810, 820 and 830 of the GUI configured for video shooting and sharing according to an embodiment of the present disclosure. Diagram 810 shows an "Inbox" page listing the inbound messages and the accompanying threads received from the social network. Diagram 820 shows a "Sent" page listing the outbound messages and the accompanying threads. Diagram 830 lists only the Favorite messages including marked outbound and inbound messages.

Figure 9:
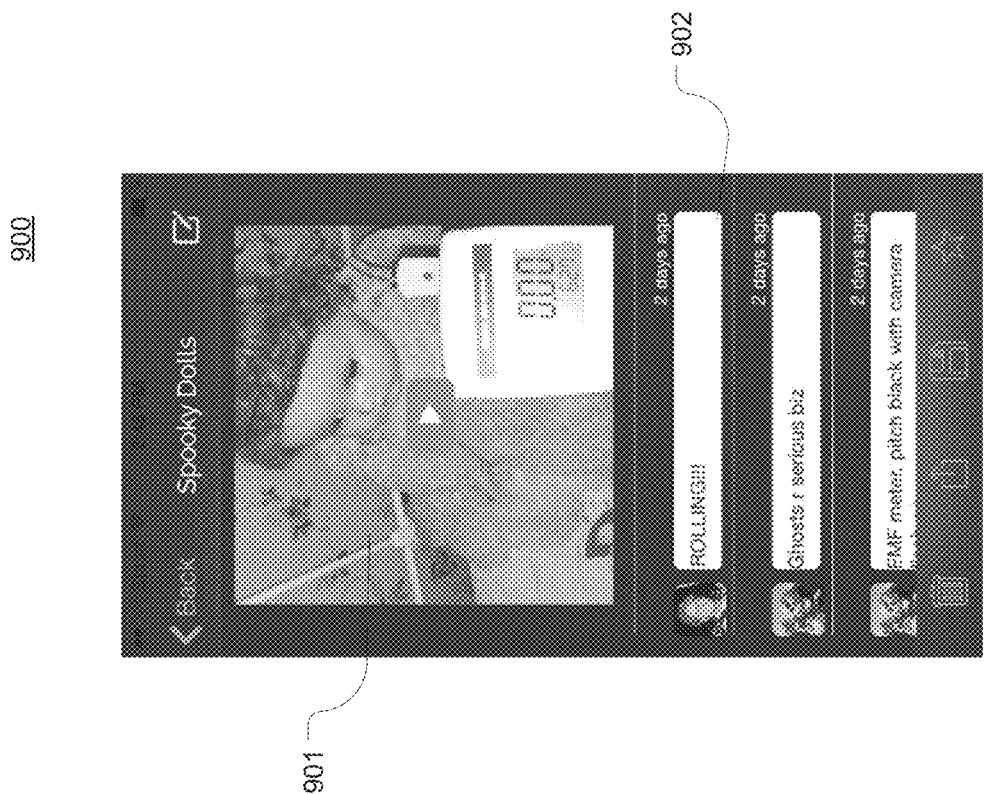
FIG. 9 illustrates an exemplary message viewing page of the GUI according to an embodiment of the present disclosure.

By selecting any of the listed messages, the user can open the video for playback and view the accompanying text within the GUI, and leave a reply as shown in FIG. 9. This creates a shared thread amongst the recipients. FIG. 9 illustrates an exemplary message viewing page 900 of the GUI according to an embodiment of the present disclosure. The message view page can present the video 901 and the conversation thread 902 about it. Any user involved in the thread will receive new inbox notifications when new replies are added. Recipients can mark the message as a favorite to add the message to the "Favorite" box for easy access later on.

Figure 10:
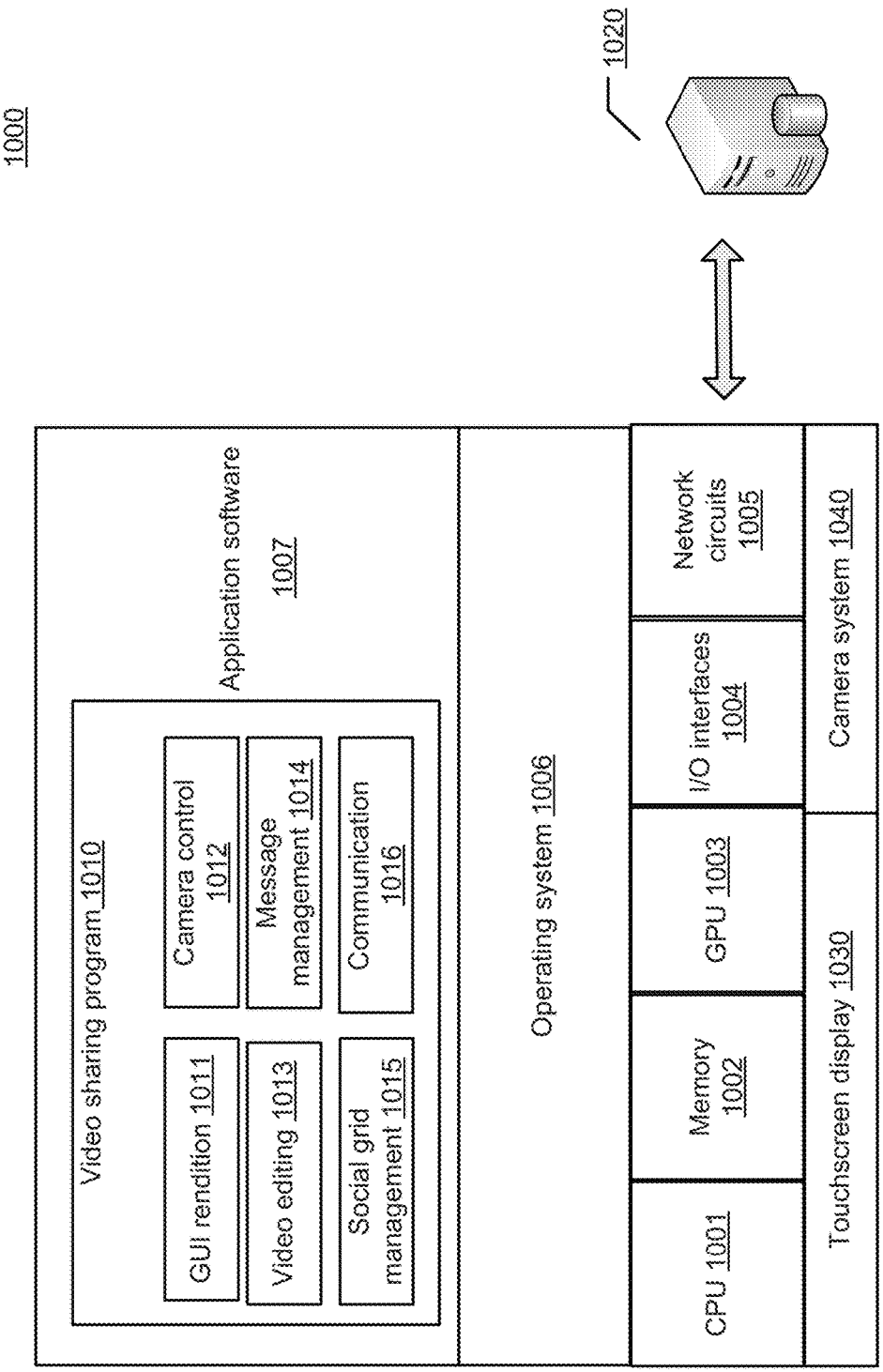
FIG. 10 is a block diagram illustrating an exemplary mobile computing device including a video shooting and sharing program in accordance with an embodiment of the present disclosure.

FIG. 10 is a block diagram illustrating an exemplary mobile computing device 1000 including a video shooting and sharing program 1010 in accordance with an embodiment of the present disclosure. The computing device 1000 includes a central processing unit (CPU) 1001, memory 1002, an optional graphics processing unit (GPU) 1003, I/O interfaces 1004, network circuits 1005, an operating system 1006, a camera system 1040, and a touchscreen display 1030. The memory 1002 stores application software 1007 including the video shooting and sharing program 1010. The computing system 1000 may be a smart phone, a touch pad, or other mobile computing devices. The mobile operating system 1006 may be Android, iOS, Windows or alike. The device 1000 is communicably coupled to a social network server 1020 via the Internet.

In addition to video sharing messages, a video shooting and sharing application according to the present disclosure also provides a user interface for users to communicate in other manner, such as emails, instant text messages, and/or video calls, etc.

The video shooting and sharing program 1010 includes a GUI rendition module 1011, a camera control module 1012, a video editing module 1013, a message management module 1014, a contact grid management module 1015, and a communication module 1016. The GUI rendition module renders various GUI pages or modes for display on the touchscreen display device 1030. The camera control module 1012 controls the operations of camera system 1040 based on user instructions received by the GUI, e.g., capturing a video, pausing or resuming the video capturing, etc. The video editing module 1013 provides editing functionalities for a user to edit the video during and after the capturing. The message management module 1014 organizes inbound and outbound messages and notifications in a message center. The social grid management module 1015 organizes the contact in a grid like pattern and adjusts the pattern based on user input and/or automatically. The communication module 1016 communicates with the server regarding inbound and outbound video sharing messages.

The video shooting and sharing program 1010 may perform various other functions as discussed in detail with reference to FIG. 1-FIG. 9. As will be appreciated by those with ordinary skill in the art, the video shooting and sharing program 1010 can be implemented in any one or more suitable programming languages that are known to those skilled in the art, such as C, C++, Java, Python, Perl, C #, SQL, etc.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A computer implemented method of facilitating users to organize contact information on a computing device, said method comprising:

accessing digital content;

rendering an on-screen graphical user interface (GUI) for display on a display device associated with said computing device, wherein said on-screen GUI comprises a grid like visual object comprising a plurality of pictorial tiles of various sizes arranged in a grid like pattern, wherein a respective pictorial tile represents a contact group comprising one or more contacts related to an application program, wherein said one or more contacts are selected and compiled into said contact group by said user, wherein each pictorial tile is substantially rectangular and comprises a rectangular image that substantially fills an area of said pictorial tile with an alpha numerical overlay over the image, wherein said alpha numerical overlay comprises a group name and said image being related to the one or more contacts associated with the contact group;

responsive to a first user interaction with said respective pictorial tile being displayed in said grid like visual object, initiating distribution of said digital content to said contact group through network transmission; and changing said grid like pattern based on user input, wherein said changing said grid like pattern comprise varying display formats of text displayed with said plurality of pictorial tiles; and automatically changing said grid like pattern based on a set of predetermined attributes, stored within said computing device, of a plurality of contact groups represented by said plurality of pictorial tiles, wherein said automatically changing comprises automatically changing a tile size in said grid like pattern based on a predefined trigger event related to said set of predetermined attributes, wherein said set of predetermined attributes comprises: respective numbers of individual contacts within said plurality of contact groups; respective contact frequencies of said plurality of contact groups; and respective user preferences of said plurality of contact groups, and wherein said plurality of pictorial tiles comprise a pictorial tile associated with editing functions for said grid like visual object and said plurality of contact groups.

2. The computer implemented method of claim 1 further comprising:
   responsive to a second user interaction with said respective pictorial tile, displaying information related to said one or more contacts within said on-screen GUI, wherein said information comprises contact information and a communication history; and
   editing a composition of said contact group or information of said one or more contacts based on user input.

3. The computer implemented method of claim 1, wherein said changing said grid like pattern further comprises one or more of adjusting aspect ratios and sizes of said plurality of pictorial tiles and changing locations of said plurality of pictorial tiles within said grid like pattern.

4. The computer implemented method of claim 1, wherein said respective pictorial tile comprises a still image or a moving image that is user-configurable.

5. The computer implemented method of claim 1, wherein a plurality of contact groups respectively represented by said plurality of pictorial tiles are affiliated with different social media networks.

6. The computer implemented method of claim 1, wherein said application program is a social media network application software, and wherein said computing device is a mobile computing device.

7. The computer implemented method of claim 1, wherein application program is an email application, and wherein said operation comprises selecting said one or more contacts as recipients of an email.

8. A non-transitory computer-readable storage medium embodying instructions that, when executed by a processing device, cause the processing device to perform a method of facilitating user accesses to contact information, said method comprising:
   accessing digital content;
   rendering an on-screen graphical user interface (GUI) for display on a display device coupled to a computing device, wherein said on-screen GUI is configured to present a grid like graphical object comprising a plurality of tile graphical objects of various sizes and arranged in a display pattern,
   wherein a respective tile graphical object represents a contact group comprising one or more contacts selected and compiled into said contact group by a user of said computing device, wherein said one or more contacts are affiliated with a social media network, and wherein further a first user interaction with said respective tile graphical object being displayed in said grid like graphical object corresponds to a user instruction to initiate distribution of said digital content to said one or more contacts through network transmission, wherein each tile graphical object is substantially rectangular and comprises a rectangular image that substantially fills an area of said tile graphical object with an alpha numerical overlay over the image, wherein said alpha numerical overlay comprises a group name and said image being related to said one or more contacts associated with said contact group;
   responsive to said first user interaction, sending said digital content from the processing device to a server of said social media network for sharing; and
   changing said display pattern based on user input, wherein said changing said display pattern comprises varying formats of text displayed within said plurality of tile graphical objects;
   dynamically changing said display pattern based on a set of predetermined attributes, stored within said processing device, with respect to said contact groups represented by said grid graphical object,
   wherein said dynamically changing comprises dynamically changing a tile graphical object size based on a predefined trigger event related to said set of predetermined attributes, wherein said set of predetermined attributes comprises: respective numbers of contacts of said contact groups; respective contact frequencies of said contact groups; and respective user preferences of said contact groups, and wherein said plurality of tile graphical objects comprise tile graphical object associated with editing functions for said grid like graphical object and contact groups represented by said grid like graphical object.

9. The non-transitory computer-readable storage medium of claim 8, wherein said method further comprises, responsive to a second user interaction with said on-screen GUI, causing an imaging device of said computing device to capture a video, wherein said digital content comprises said video.

10. The non-transitory computer-readable storage medium of claim 8, wherein said method further comprises:
   responsive to a second user interaction with said respective tile graphical object, displaying information related to said one or more contacts within said on-screen GUI, wherein said information comprises contact information and a communication history,
   wherein said display device comprises a touchscreen display,
   wherein first user interaction correspond a user single-tap gesture on said touchscreen display, and
   wherein further said second user interaction corresponds to a user double-tap gesture on said touchscreen display; and
   removing a contact from said contact group based on user input for a sharing event.

11. The non-transitory computer-readable storage medium of claim 8, wherein said changing said display pattern further comprises one or more of adjusting sizes of said plurality of tile graphical objects and changing locations of said plurality of tile graphical objects within said grid like graphical object.

12. The non-transitory computer-readable storage medium of claim 8, wherein said respective tile graphical object comprises a still image or a moving image selected by said user.

13. The non-transitory computer-readable storage medium of claim 8, wherein said contact groups represented by said grid like graphical object are affiliated with different social media networks.

14. A computing device comprising:
   a processor;
   communication circuits coupled to said processor;
   memory coupled to said processor for storing a set of predetermined attributes; and
   memory coupled to said processor and comprising instructions that, when executed by said processor, cause the computing device to perform a method of facilitating user accesses to contact information, said method comprising:
   accessing digital content;
   rendering an on-screen graphical user interface (GUI) for display on a display device associated with said computing device, wherein said on-screen GUI comprises a grid like visual object comprising a plurality of pictorial tiles of various sizes and arranged in a grid like pattern, wherein a respective pictorial tile represents a contact group comprising one or more contacts related to an application program, wherein said one or more contacts are selected and compiled into said contact group by a user and, wherein each pictorial tile is substantially rectangular and comprises a rectangular image that substantially fills an area of said pictorial tile with an alpha numerical overlay over the image, wherein said alpha numerical overlay comprises a group name and said image being related to said one or more contacts associated with said contact group;

responsive to a first user interaction with said respective pictorial tile, initiating distribution of said digital content to said one or more contacts through network transmission and without any other user interaction with said GUI between said first user interaction and said initiating; and changing said grid like visual object based on user input, wherein said changing comprises one or more of adjusting sizes of said plurality of tile graphical objects, varying formats of text displayed within said plurality of tile graphical objects; and changing locations of said plurality of tile graphical objects within said grid like graphical object;

automatically changing said grid pattern based on the set of predetermined attributes of a plurality of contact groups represented by said plurality of pictorial tiles, wherein said automatically changing comprises automatically changing a size of a tile graphical object based on a predefined trigger event related to said set of predetermined attributes, wherein said set of predetermined attributes comprises: respective numbers of contacts in said plurality of contact groups; respective contact frequencies of said plurality of contact groups; and respective user-indicated preferences of said plurality of contact group, and wherein said plurality of tile graphical objects comprise tile graphical object associated with editing functions for said grid like graphical object and contact groups represented by said grid like graphical object.

15. The computing device of claim 14, wherein said method further comprises:

responsive to a second user interaction with said respective pictorial tile, displaying contact information of said one or more contacts within said on-screen GUI; and editing a composition of said contact group or said contact information based on user input.

16. The computing device of claim 14, wherein said respective pictorial tile comprises a moving image.

* * * * *